United States Patent
Ogawa et al.

(10) Patent No.: US 12,336,533 B2
(45) Date of Patent: *Jun. 24, 2025

(54) PINK BOLLWORM CONTROL METHOD

(71) Applicant: SHIN-ETSU CHEMICAL CO., LTD., Tokyo (JP)

(72) Inventors: Kinya Ogawa, Tokyo (JP); Kazuomi Sato, Niigata (JP); Nobuaki Ishizawa, Tokyo (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 503 days.

This patent is subject to a terminal disclaimer.

(21) Appl. No.: 17/785,110

(22) PCT Filed: Dec. 18, 2020

(86) PCT No.: PCT/JP2020/047438
§ 371 (c)(1),
(2) Date: Jun. 14, 2022

(87) PCT Pub. No.: WO2021/125323
PCT Pub. Date: Jun. 24, 2021

(65) Prior Publication Data
US 2023/0014675 A1    Jan. 19, 2023

(30) Foreign Application Priority Data
Dec. 20, 2019    (JP) ................................ 2019-230461

(51) Int. Cl.
*A01N 25/00* (2006.01)
*A01M 1/02* (2006.01)
*A01N 31/04* (2006.01)
*A01N 37/06* (2006.01)
*A01P 19/00* (2006.01)

(52) U.S. Cl.
CPC ............... *A01N 25/00* (2013.01); *A01M 1/02* (2013.01); *A01N 31/04* (2013.01); *A01N 37/06* (2013.01); *A01P 19/00* (2021.08)

(58) Field of Classification Search
CPC ........ A01N 31/04; A01N 37/06; A01N 25/00; A01M 1/02; A01P 19/00
See application file for complete search history.

(56) References Cited

FOREIGN PATENT DOCUMENTS

| JP | 56-104802 A | 8/1981 |
|---|---|---|
| JP | 5-3746 A | 1/1993 |
| JP | 6-65007 A | 3/1994 |
| JP | 2006-83088 A | 3/2006 |
| JP | 2013-14585 A | 1/2013 |

OTHER PUBLICATIONS

Kinya Ogawa. "Pest Control by Pheromone Mating Disruption and the Role of Natural Enemies". Journal of Pesticide Science, vol. 25, pp. 456-461 (2000).
International Search Report for International Application No. PCT/JP2020/047438, dated Feb. 2, 2021 (4 pages).
Written Opinion for International Application No. PCT/JP2020/047438, dated Feb. 4, 2021 (4 pages).
D. Lykouressis, et al. "Management of the Pink Bollworm Pectinophora gossypiella (Saunders) (Lepidoptera: Gelechildae) by Mating Disruption in Cotton Fields". Crop Protection, vol. 24, No. 2, pp. 177-183 (2005).
Kinya Ogawa. "Trends and Problems in Pheromone Control Overseas". Agriculture and Gardens, vol. 76, No. 1, pp. 176-182 (2001).
Boguslawski, C., et al. "Studies in Cotton Fields in Egypt on the Effects of Pheromone Mating Disruption on Pectinophora gossypiella (Saund.) (Lep., Gelechiidae), on the Occurrence of Other Arthropods, and on Yields". Journal of Applied Entomology, vol. 125, No. 6, pp. 327-331 (2001).
Fred T. Cooke, Jr., et al. "The Economics of BT Cotton in the Mississippi Delta". Proceedings of the Beltwide Cotton Conference, vol. 1, pp. 175-177, 2001 (3 pages),.
International Search Report for International Application No. PCT/JP2020/047444, dated Feb. 4, 2021 (4 pages).
Written Opinion for International Application No. PCT/JP2020/047444, dated Feb. 4, 2021 (4 pages).

*Primary Examiner* — Snigdha Maewall

(57) ABSTRACT

Provided is a pink bollworm control method that controls pink bollworms by using a mating disruption method to disturb the mating of the pink bollworms. The method including at least: a step in which cotton seedlings are planted in a field 21-41 days after the appearance of adult pink bollworms if said adult pink bollworms are a first generation, or 1-21 days after the appearance of adult pink bollworms if said adult pink bollworms are a second or later generation; and a step in which a controlled-released sexual pheromone formulation including at least Z,Z/Z,E-7,11-hexadecadienyl acetate, which is a pink bollworm sexual pheromone substance, is placed in the field 2-15 days before the predicted adult appearance date for the next generation of adults of said pink bollworms, as derived from effective accumulated temperature, and the sexual pheromone substance in the controlled-release sexual pheromone formulation is released in the field.

4 Claims, No Drawings

PINK BOLLWORM CONTROL METHOD

CROSS-REFERENCE TO RELATED APPLICATIONS

This application is a U.S. National phase filing of international patent application serial number PCT/JP2020/047438, entitled "PINK BOLLWORM CONTROL METHOD", filed Dec. 18, 2020, which claims priority of Japanese Patent Application No. 2019-230461, filed Dec. 20, 2019. The contents of the above-referenced applications are incorporated herein by reference in their entireties for all purposes.

TECHNICAL FIELD

The invention relates to a method for controlling a pink bollworm.

BACKGROUND ART

A pink bollworm (scientific name: *Pectinophora gossypiella*; hereinafter also referred to as "PBW") is the main insect pest of cotton, and invades the young buds, flowers, and young balls of cotton immediately after the larvae hatch. Thus, it is difficult for insecticides and natural enemies to come into contact with the larvae, so that it has been conventionally difficult to control the larvae. For this reason, various methods have been investigated for controlling the pink bollworm.

For example, as the mating disruption for disrupting the mating activity between male and female insect pests using a sex pheromone secreted by an adult female insect pest, it is proposed to install sex pheromone preparations before an early flower bud or the like is produced in consideration of the fact that the egg-laying site of female pink bollworms that mated with male pink bollworms at the initial stage is a cotton flower bud or the like (Non-Patent Document 1).

In addition, a pink bollworm has been controlled by Bt cotton having the gene of insecticidal microorganism *Bacillus thuringiensis* incorporated into a cotton seed. Since the Bt cotton has the gene of Bt incorporated in the seed, it is possible to suppress damage to the balls by killing the pink bollworms in the balls after allowing the pink bollworm larvae to invade into the young balls of cotton and eat the cottonseeds containing Bt.

PRIOR ART DOCUMENT

Non-Patent Document

Non-Patent Document 1: Journal of Pesticide Science 2000, 25, 456-461

SUMMARY OF THE INVENTION

Problem to be Solved by the Invention

However, when sex pheromone preparations are installed before early flower buds or the like are formed as described in Non-Patent Document 1, it is necessary for adult workers to bend over for installing the pheromone preparations because of incomplete growth of the cotton trees. Thus, there is a problem in the workability. In addition, the control of cotton insect pests has been conventionally developed from the viewpoint of reducing the damage to cotton balls, so that the damage to balls caused by pink bollworm larvae has been measured without investigating the damage to flower buds.

On the other hand, when the Bt cotton having the gene of insecticidal microorganism *Bacillus thuringiensis* incorporated into a cotton seed is used, the damage to balls can be suppressed to some extent. However, the effect of the insecticidal component is very weak so that the insecticidal component present only in the cotton balls is ineffective on the PBW larvae outside the balls.

It has also been found that when early flower buds, buds or flowers are damaged by larvae hatched from pink bollworm eggs laid on cotton buds, buds or flowers, cotton trees lose their motivation to form balls, or consume energies in the growth of leaves, stems, etc. As a result, it becomes clear to cause the phenomenon known as "vegetation", which reduces the ability to make balls, reduces the number of balls, and reduces cotton yield.

The invention has been made in view of the above circumstances, and an object of the invention is to provide a method for controlling a pink bollworm by the mating disruption in which the mating of pink bollworm is disrupted, the method capable of suppressing the damage to flower buds, buds or flowers and the damage to balls without reducing the yield of cotton.

Solution to the Problem

As a result of intensive studies to achieve the above-mentioned object, the inventors have found the method for controlling a pink bollworm by selecting the planting period of cotton seedlings and the installation period of sustained release pheromone preparations based on the timing of adult pink bollworm emergence in such a manner as to obtain sufficient effects even in an area where the temperature in the early spring is relatively high. The method can suppress the damage to flower buds, buds or flowers by pink bollworms and the damage to balls, and increase the yield of cotton in comparison with the conventional yield. Thus, the inventors have completed the invention.

In an aspect of the invention, there is provided a method of controlling a pink bollworm comprising steps of:

planting a cotton seedling in a field during a period of from 21 days to 41 days after an emergence date of the first-generation adult pink bollworm, or during a period of from 1 day to 21 days after an emergence date of the second or later generation adult pink bollworm; and installing a sustained release sex pheromone preparation comprising Z,Z/Z,E-7,11-hexadecadienyl acetate, which is a sex pheromone substance of the pink bollworm, in the field during a period of from 2 days to 15 days before a predicted emergence date of the next-generation adult pink bollworm, the predicted emergence date being derived from accumulated degree days, to release the Z,Z/Z,E-7,11-hexadecadienyl acetate into the field.

Effect of the Invention

According to the invention, the damages to early flower buds or the like and the damages to balls of cotton over the entire period, caused by pink bollworms, are suppressed, and the yield of cotton is increased.

Mode for Carrying Out the Invention

The timing of planting a cotton seedling in the field with regard to the method for controlling a pink bollworm is variable depending on whether the emerging adult bollworm is of the first generation or the second or later generation. The generation of insect pests emerging several times a year is determined in accordance with the method defined by the Japanese Society of Applied Entomology & Zoology, and the generations of wintering generation descendants appearing within the year are called, for example, the first generation and the second generation with ordinal numbers.

The pink bollworms to be controlled are preferably of the second or later generation, more preferably the third or fourth generation. The first-generation pink bollworms have been called the suicide generation so that the pink bollworms to be controlled have been conventionally of the second or later generation. In South Asia such as India and Pakistan, where temperatures in early spring are high, agricultural water cannot be secured because of low rainfall during the period when the first-generation adult pink bollworms emerge, so that cotton seedlings cannot be planted in many cases. Therefore, it is difficult to control the first-generation adult pink bollworms.

When the second-generation adult pink bollworms are targeted for control, cotton seedlings will be planted during the period of from 21 days to 41 days, preferably during the period of from 25 days to 35 days after emergence date of the first-generation adult pink bollworm. By planting the cotton seedlings during the period of from 21 days to 41 days after the emergence date of the first-generation adult pink bollworm, the formation of early flower buds and the like can be prevented during the period when the first-generation adult pink bollworms emerge at the low temperature. In addition, when the second-generation adult pink bollworms are targeted for control, the problem of water shortage can be solved because there are reservoirs in many of the double cropping areas.

Thus, when the adult pink bollworms are of the first generation, it is a period of from 21 days to 41 days after the emergence date of the first-generation adult pink bollworm.

When the third or later generation adult pink bollworms are targeted for control, cotton seedlings will be planted during the period of from 1 day to 21 days (i.e., the period of no less than 1 day to 21 days), preferably the period of from 1 day to 15 days after the emergence date of the second or later generation adult pink bollworm. When the cotton seedlings are planted less than one day after the emergence date of adult pink bollworm, early flower buds, etc. may be formed during the period when the second or later generation adult pink bollworms are emerging, so that the flower buds, etc. may be damaged. When the cotton seedlings are planted more than 21 days after the emergence date of adult pink bollworm, the cotton trees will be still small so that it is difficult to install the sustained release pheromone preparations before the next-generation adult pink bollworms emerge. By adjusting the timing of planting the cotton seedlings in such a manner as to allow the early flower buds to come out during the period when the adult pink bollworms do not emerge, the damage to the early flower buds and the like can be suppressed. Consequently, the cotton trees do not lose the motivation to form balls, and the energy is used for the growth of balls, so that the reduction in the number of balls and the reduction in the yield of the cotton can be suppressed.

The emergence date of adult pink bollworm is determined to be the date at which the adult pink bollworm is captured in the trap. More specifically, one or two traps are installed, prior to the emergence of adult pink bollworm, in the field where cotton seedlings will be planted, and the date at which an adult pink bollworm is captured is determined to be the emergence date of adult pink bollworm. Although most of the traps on the market can be used, a delta trap is preferred from the viewpoint of stability. The installation height of the trap is preferably 20 to 70 cm above the ground, depending on the height of the cotton tree.

The installation time of the sustained release pheromone preparation is from 2 days to 15 days, preferably from 2 days to 10 days, and more preferably from 2 days to 5 days before the predicted emergence day of the next-generation adult pink bollworm, where the predicted emergence day is derived from the accumulated degree days. For example, when the emerging adult pink bollworm is of the first generation, an adult pink bollworm whose emergence date is predicted is of the second generation; and when the emerging adult pink bollworm is of the second generation, an adult pink bollworm whose emergence date is predicted is of the third generation. The reason why the installation time of the sustained release pheromone preparation is based on the predicted emergence date of the next-generation adult pink bollworm is that the pink bollworms can mate when the preparations are installed after the emergence of the pink bollworm. Thus, the sustained release pheromone preparation cannot work effectively. In addition, when the installation time of the sustained release pheromone preparation is earlier than 15 days before the predicted emergence date of the next-generation adult pink bollworm, it becomes difficult to install the sustained release pheromone preparation due to the small cotton tree. When the installation time is later than 2 days before the predicted emergence date of the next-generation adult pink bollworm, mating of the next-generation adult pink bollworm cannot be prevented so that the pink bollworm cannot be controlled.

The predicted emergence date of the next-generation adult pink bollworm is derived from the accumulated degree days (hereinafter also referred to as "ADD") of the pink bollworm. For example, in the western region of the United States, the daily average temperature (° F.) is measured from February 1 in a field where emergence of the next-generation adult pink bollworm is predicted, and a value obtained by subtracting the developmental zero 57° F., which is a minimum limit point of the temperature required for development of the pink bollworm, from the daily average temperature, is used as the base temperature for ADD of the day, and the daily base temperatures are accumulated. When the average temperature of the day is lower than the developmental zero, the base temperature of the day is determined to be 0° F. It is reported that when the ADD reaches 408° F., the first-generation pink bollworm (PBW) emerges; when the ADD reaches 918° F., the first-generation PBW reaches the peak; when the ADD reaches 1825° F., the first-generation PBW ends; the ADD from the end of the first-generation adult PBW to the emergence of the next-generation adult PBW is 800° F.; and the ADD from the emergence of the next-generation adult PBW to the end of the next-generation adult PWA is 886° F. (see the University of California Press "Integrated Pest Management for Cotton in the Western Region of the United States Second Edition").

Based on the above information or the ADD obtained in advance with respect to the emergence and end of the pink bollworm in the region where cotton cultivation was actually carried out in the year or years before the relevant year, the emergence date of the next-generation adult pink bollworm is predicted by correcting the ADD as necessary. For example, it is possible to estimate the emergence date of each generation pink bollworm in the western region of the United States as follows.

TABLE 1

| | ADD (° F.) | increment of ADD (° F.) |
|---|---|---|
| emergence date of the first generation | 408 | 1417 |
| end date of first generation | 1825 | 800 |
| emergence date of the second generation | 2625 | 886 |
| end date of second generation | 3511 | 850 |
| emergence date of the third generation | 4361 | 849 |
| end date of third generation | 5210 | 800 |
| emergence date of the fourth generation | 6010 | |

Since the ADD is affected by the lowest and highest daily temperatures depending on a region, it is desirable to confirm the ADD in the region where the sustained release pheromone preparations will be used.

In addition, if a trap is installed in the field 10 days before the predicted emergence day of adult pink bollworm to check the error in the ADD obtained in the year or years before the relevant year, then the predicted emergence day of the next-generation adult pink bollworm can be estimated with higher accuracy.

A sustained release pheromone preparation comprises Z,Z/Z,E-7,11-hexadecadienyl acetate as a sex pheromone substance and a polymer container having the Z,Z/Z,E-7,11-hexadecadienyl acetate sealed therein.

Examples of the sex pheromone substance include Z,Z/Z,E-7,11-hexadecadienyl acetate, which are sex pheromone substances of pink bollworm.

It is preferable to use a mixture of Z,Z/Z,E-7,11-hexadecadienyl acetate and Z,Z/Z,E-7,11-hexadecadienol from the viewpoint of preventing the decrease in the mating disruption when the pink bollworms are present at a high density. The mass ratio of Z,Z/Z,E-7,11-hexadecadienyl acetate to Z,Z/Z,E-7,11-hexadecadienol is preferably from 99.5:0.5 to 95.0:5.0, more preferably from 99.0:1.0 to 96.0:4.0, and still more preferably from 98.5:1.5 to 96.5:3.5.

The sustained release pheromone preparation may comprise, in addition to the sex pheromone substance, an optional additive such as an antioxidant and an ultraviolet absorber, depending on the degree of stability of the sex pheromone substance.

Examples of the antioxidant include synthetic antioxidants such as BHT (butylhydroxytoluene), BHA (butylhydroxyanisole), ethyl protocatechuate, isoamyl gallate, and propyl gallate; and natural antioxidants such as NDGA (nordihydroguaiaretic acid) and gum guaiac.

Examples of the ultraviolet absorber include para-aminobenzoic acid-based derivatives such as octyl 4-(dimethylamino)benzoate; benzophenone derivatives such as oxybenzone (i.e., 2-hydroxy-4-methoxybenzophenone) and 2-hydroxy-4-octoxybenzophenone; methoxycinnamic acid derivatives; and salicylic acid derivatives.

Each content of the antioxidant and the ultraviolet absorber is preferably from 0.01 to 5% by mass, and the total content of the antioxidant and the ultraviolet absorber is preferably from 0.02 to 10% by mass.

As a material of the polymer container, a polyolefin-based polymer is preferred. Examples of the polyolefin-based polymer include polyolefins scuh as polyethylene and polypropylene; and ethylene-vinyl acetate copolymers. The polymer material allows a sex pheromone substance or the like to permeate through the polymer material and be released outside the polymer membrane at an appropriate rate. As a material of the polymer container, biodegradable polyesters and polyvinyl chloride can also be used.

Examples of the shape of the polymer container include a tube and a bag. The tube is preferable from the viewpoint of a prolonged period of releasing a sex pheromone substance and uniform release. From the viewpoint of an appropriate release rate, the inner diameter of the tube is preferably from 0.5 to 2.0 mm, more preferably from 0.6 to 1.5 mm, and the thickness of the tube is preferably from 0.3 to 0.8 mm, more preferably from 0.4 to 0.6 mm. The length of the tube is preferably from 10 cm to 1 m, more preferably from 20 to 50 cm.

A polymer container having a shape as described above is not limited to containing one chamber for enclosing a sex pheromone substance, and may comprise two or more chambers. When the container comprises two or more chambers, the inner diameter and the thickness of each chamber may be different, and the sex pheromone substance may be enclosed in at least one chamber.

When the container comprises at least one chamber having a sex pheromone substance of pink bollworm and an optional additive enclosed therehin, the amount of the sex pheromone substance and the optional additive in the container is variable depending on the release period, the volatility of the sex pheromone substance, the affinity with the container material, and the like. The amount of sex pheromone substance and an optional additive in the container is preferably from 50 to 500 mg.

EXAMPLES

Hereinafter, the invention will be described in detail with reference to Examples and Comparative Examples. However, it should not be construed that the invention is limited to or by Examples.

Production of Sustained Release Pheromone Preparation

Z,Z/Z,E-7,11-Hexadecadienyl acetate and Z,Z/Z,E-7,11-hexadecadienol were mixed in a mass ratio of 97.8:2.2, and then subjected to addition of 2% by mass of butylhydroxytoluene as an antioxidant and 2% by mass of 2-hydroxy-4-octoxybenzophenone as an ultraviolet absorber, relative to the total mass of Z,Z/Z,E-7,11-hexadecadienyl acetate and Z,Z/Z,E-7,11-hexadecadienol, to obtain a mixture. Each sustained release pheromone preparation to be installed in a field in Examples was produced by filling a 20 cm polyethylene tube having an inner diameter of 0.9 mm and a wall thickness of 0.6 mm with 160 mg of the obtained mixture.

Damage to Flowers

When cotton seedlings were planted after the emergence date of the first-generation adult pink bollworm, 100 flowers in each lot were observed every week from 6 weeks to 10 weeks after planting the cotton seedlings. When cotton seedlings were planted after the emergence date of the second or later generation adult pink bollworm, 100 flowers in each lot were observed every week from the 5th week to the 9th week after planting the cotton seedlings. Then, the average value of the number of damaged flowers was obtained with the proviso that a flower containing a pink bollworm larva or having the color darkened, or a withered flower was rated as "damaged", while a flower having the color of yellow white or pink was rated as "not damaged".

Damage to Balls

Fifty young balls were collected every week from the 11th week to the 15th week after planting the cotton seedlings, and kept in a box at 30° C. and 70% humidity for two weeks. Then the balls were split for observation. A ball containing the pink bollworm larva changed to red was rated as "damaged".

Percentage of Good Quality Products

When cotton seedlings were planted after the emergence date of the first-generation adult pink bollworm, 50 open cottonseeds were collected from each lot at 15 weeks, 20 weeks, and 26 weeks after planting the cotton seedlings. When cotton seedlings were planted after the emergence date of the second or later generation adult pink bollworm, 50 open cottonseeds were collected from each lot at 14 weeks, 19 weeks, and 25 weeks after planting the cotton seedlings. The white cotton without being colored was rated as "good quality product", while the cotton colored from black to yellow was rated as "poor quality products". The percentage of good quality products was obtained as the ratio of the number of good quality products to the total number of collected cottonseeds.

Examples 1-1, 1-2, 1-3 and Comparative Example 1

A field having a length of 250 m and a width of 1000 m was divided transversely from south to north into five lots, which were assigned from south to north as Lot A1 (Example 1-1), Lot B1 (Example 1-2), Lot C1 (Example 1-3), Lot D1 (Comparative Example 1-1), and Lot E1 (Comparative Example 1-2), respectively. Each lot had an area of 5 hectares. Bt cotton seedlings were planted in Lot A1 five days after the emergence date of the second-generation adult pink bollworm (PBW), in Lot B1 ten days after the emergence date of the second-generation adult PBW, and in Lot C1 fifteen days after the emergence date of the second-generation adult PBW. Cotton seedlings were planted in Lots D1 and E1 five days before the predicted emergence date of the second-generation adult PBW, where the predicted emergence date was derived from the accumulated degree days. However, the actual emergence date of the adult PBW was delayed by two days from the predicted emergence date, which means that the cotton seedlings were planted seven days before the actual emergence date of the second-generation adult PBW.

Thereafter, 400 sustained release pheromone preparations per hectare were installed 4 days before the predicted emergence date of the third-generation adult PBW in each of Lots A1, B1, C1 and D1, where the predicted emegence date was derived from the accumulated degree days. No sustained release pheromone preparation was installed in Lot E1.

In addition, in order to control the sucking pests, the insecticide urara DF (Ishihara Biosciences K.K.) was sprayed in each lot 6 weeks and 10 weeks after planting the cotton seedlings, and mothpiran (Nippon Soda Co., Ltd.) was sprayed in each lot 8 weeks after planting the cotton seedlings.

The damage to flowers, the yield of cotton, and the percentage of good quality products were determined in each lot. The results are shown in Table 2.

TABLE 2

| lot | | damage to flowers (the number of damaged flowers) | yield of cotton (t/ha) | percentage of good quality products (%) |
|---|---|---|---|---|
| Example 1-1 | A1 | 4.4 | 4.1 | 80.9 |
| Example 1-2 | B1 | 1.2 | 4.7 | 87.9 |
| Example 1-3 | C1 | 1.0 | 4.6 | 85.5 |
| Comp. Ex. 1-1 | D1 | 8.0 | 3.5 | 72.5 |
| Comp. Ex. 1-2 | E1 | 16.4 | 2.8 | 69.9 |

In each lot of Examples, since the flower buds did not grow during the period when the second-generation adult PBW emerged, the damage to the early flower buds was scarcely caused. Therefore, both of the yield of cotton and the percentage of good quality products were higher than those in each lot of Comparative Examples. In addition, since Lot B1 was sandwiched transversely between the lots in which the sustained release pheromone preparations were installed, the yield of cotton and the percentage of good quality products were the highest.

On the other hand, the damage to flowers was smaller and the yield of cotton and the percentage of good quality products were higher in Lot D1 than those in Lot E1 where the sustained release pheromone preparation was not installed. However, the yield of cotton was lowered due to the vegetation in Lot D1 because the cotton seedlings were planted early so that the second-generation adult PBW survived until the initial stage of the cotton buds.

EXAMPLE 2-1, EXAMPLE 2-2, and COMPARATIVE EXAMPLE 2

A field having a length of 300 m and a width of 600 m was divided transversely from northeast to southwest into three lots, which were assigned from northeast to southwest as Lot A2 (Example 2-1), Lot B2 (Example 2-2), and Lot D2 (Comparative Example 2), respectively. Each lot had an area of 6 hectares. In each lot, cotton seedlings were planted 7 days after the emergence day of the third-generation adult PBW. Ordinaly cotton seedlings without gene recombination were planted in Lot A2, and Bt cotton seedlings were planted in Lots B2 and D2.

Thereafter, in the same manner as in Examples 1-1 to 1-3 except that Z,Z/Z,E-7,11-hexadecadienyl acetate and Z,Z/Z,E-7,11-hexadecadienol were mixed in a mass ratio of 99.6:0.4 for Lot B2, 400 sustained release pheromone preparations per hectare were installed in each of Lots A2 and B2 eight days before the predicted emergence day of the third-generation adult PBW, where the predicted emergence day was derived from the accumulated degree days. No sustained release pheromone preparation was installed in Lot D2.

In addition, in order to control the sucking pests, the insecticide urara DF (Ishihara Biosciences K.K.) was sprayed in each lot 6 weeks and 10 weeks after planting the cotton seedlings, and mothpiran (Nippon Soda Co., Ltd.) was sprayed in each lot 8 weeks after planting the cotton seedlings.

The damage to flowers, the damage to balls, the yield of cotton, and the percentage of good quality products were determined in each lot. The results are shown in Table 3.

TABLE 3

|  | lot | damaged to flowers (the number of damaged flowers) | damage to balls (the number of damaged balls) | yield of cotton (t/ha) | percentage of good quality products (%) |
|---|---|---|---|---|---|
| Example 2-1 | A2 | 6.2 | 4.2 | 4.3 | 93.3 |
| Example 2-2 | B2 | 10.2 | 5.0 | 3.8 | 90.2 |
| Comp. Ex. 2 | D2 | 28.4 | 6.8 | 3.4 | 78.7 |

In each lot of Examples 2-1 and 2-2 in which the sustained release pheromone preparations were installed, the damage to flowers and the damage to balls were lower and the yield of cotton and the percentage of good quality products were higher than those in the lot of Comparative Example 2. In particular, since Lot A2 was located on the downwind side, the results in Lot A2 were good. In addition, when the density of PBW was high, satisfactory results were obtained by increasing the ratio of Z,Z/Z,E-7,11-hexadecadienol in spite of planting the ordinary cotton seedlings without gene recombination.

The damage to flowers was generally slightly higher than those in Examples 1-1 to 1-3. It was probably because PBW, which had been deprived of food due to harvesting on the surrounding agricultural land, flew to the lots of cotton. Because of the slightly higher damage to flowers, the yield of cotton became slightly lower.

On the other hand, since Bt cotton seedlings were planted in Comparative Example 2, the damage to balls was suppressed to some extent although the damage to flowers was large. Consequently, the vegetation occurred and the ability to make balls was reduced so that the number of balls was reduced and the yield of cotton was reduced.

EXAMPLE 3-1, EXAMPLE 3-2, EXAMPLE 3-3, and COMPARATIVE EXAMPLE 3

A field having 1600 m from northwest to southeast and 300 m from southwest to northeast was divided from northwest to southeast into four lots, which were assigned from northwest to southwest as Lot A3 (Example 3-1), Lot B3 (Example 3-2), Lot C3 (Example 3-3), and Lot D3 (Comparative Example 3), respectively. Each lot had an area of 12 hectares. Bt cotton seedlings were planted 21 days after the emergence date of the first-generation adult PBW in Lot A3, 28 days after the emergence date of the first-generation adult PBW in Lot B3, and 35 days after the emergence date of the first-generation adult PBW in Lot C3. Cotton seedlings were planted 28 days after the predicted emergence date of the first-generation adult PBW, where the predicted emergence date was derived from the accumulated degree days.

Thereafter, 500 sustained release pheromone preparations per hectare were installed in each of Lots A3, B3 and C3 seven days before the predicted emergence date of the second-generation adult PBW, where the predicted emergence date was derived from the accumulated degree days. No sustained release pheromone preparation was installed in Lot D3.

In addition, in order to control the sucking pests, the insecticide urara DF (Ishihara Biosciences K.K.) was sprayed in each lot 6 weeks and 10 weeks after planting the cotton seedlings, and mothpiran (Nippon Soda Co., Ltd.) was sprayed in each lot 8 weeks after planting the cotton seedlings. Further, the BT agent Zentari (produced by Sumitomo Chemical Co., Ltd.) was sprayed in Lot B3 in the first week and the second week after the emergence date of the second-generation adult PBW.

TABLE 4

|  | lot | damage to flowers (the number of damaged flowers) | yield of cotton (t/ha) | percentage of good quality products (%) |
|---|---|---|---|---|
| Example 3-1 | A3 | 1.6 | 4.9 | 89.1 |
| Example 3-2 | B3 | 0.8 | 5.4 | 92.5 |
| Example 3-3 | C3 | 0.4 | 5.0 | 78.1 |
| Comp. Ex. 3 | D3 | 3.2 | 2.9 | 62.4 |

In each lot of Examples 3-1, 3-2 and 3-3, the flower buds did not grow during the period when the first-generation adult PBW emerged, so that the damage to the early flower buds was scarcely caused. Therefore, both of the yield of cotton and the percentage of good quality products were higher than those in the lot of Comparative Example 3.

The reason why the damage to flowers was lower but the percentage of good quality products was lower in Lot C3 in comparison with the other Examples is considered to be that the cotton seedlings were planted later than the other Examples, and therefore the cotton tree growth was poor, some sustained release pheromone preparations fell together with the lower leaves of the cotton in the latter half, and the sex pheromone concentration in the lot was lowered, thereby resulting in the insufficient mating disruption.

On the other hand, Bt cotton was used in the lot of Comparative Example 3 so that the damage to balls was suppressed to some extent. However, Bt, which is an insecticidal component, was very weak in effect so that it was not effective on the PBW larvae outside the balls even when the Bt agent was sprayed. For this reason, the damage to the early flower buds was severe and as a result, the vegetation occurred, the ability to make balls was reduced, the number of balls was reduced, and the yield of cotton was greatly reduced.

The invention claimed is:

1. A method for controlling a pink bollworm comprising steps of:
    planting a cotton seedling in a field during a period of from 21 days to 41 days after an emergence date of the first-generation adult pink bollworm, or during a period of from 1 day to 21 days after an emergence date of the second or later generation adult pink bollworm; and
    installing a sustained release pheromone preparation comprising Z,Z/Z,E-7,11-hexadecadienyl acetate, which is a sex pheromone substance of the pink bollworm, in the field during a period of from 2 days to 15 days before a predicted emergence date of the next-generation adult pink bollworm, the predicted emergence date being derived from accumulated degree dates, to release the Z,Z/Z,E-7,11-hexadecadienyl acetate into the field.

2. The method for controlling a pink bollworm according to claim 1, wherein the emerging adult pink bollworm is of the second generation.

3. The method for controlling a pink bollworm according to claim 1, wherein the emerging adult pink bollworm is of the third generation.

4. The method for controlling a pink bollworm according to claim 1, wherein the sustained release pheromone preparation further comprises Z,Z/Z,E-7,11-hexadecadienol, and a mass ratio of the Z,Z/Z,E-7,11-hexadecadienyl acetate to the Z,Z/Z,E-7,11-hexadecadienol is from 99.5:0.5 to 95.0:5.0.

\* \* \* \* \*